UNITED STATES PATENT OFFICE.

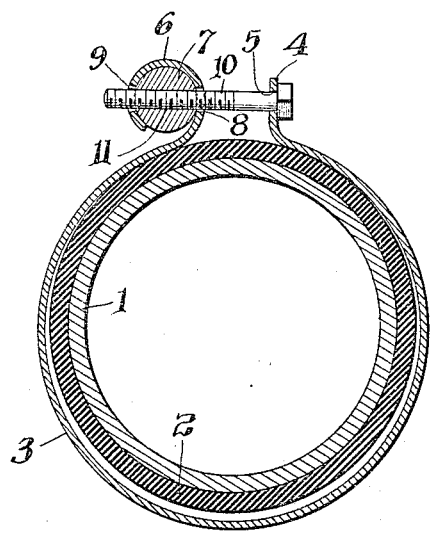
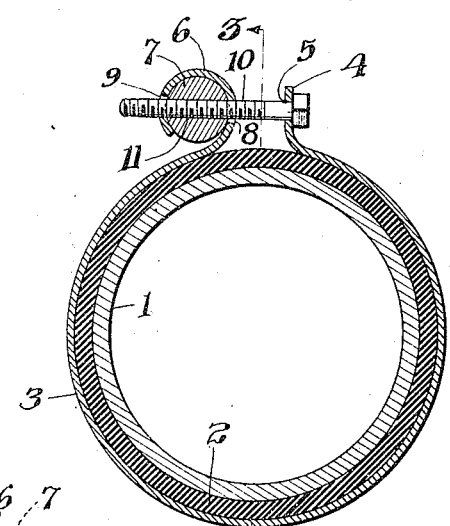
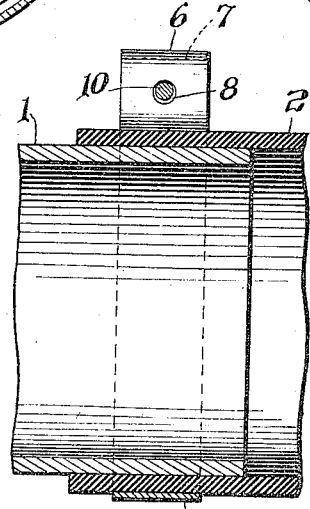
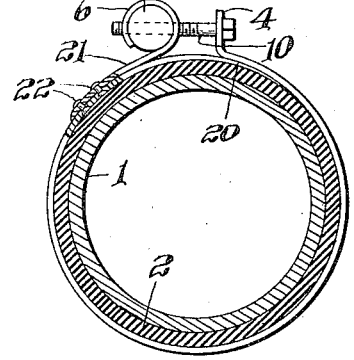
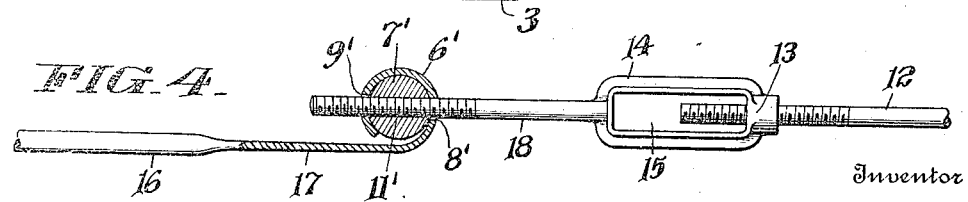

DAVID AHLDIN, OF NEW YORK, N. Y.

AUTOMATIC-LOCKING COUPLING CONNECTION.

1,269,038.     Specification of Letters Patent.      Patented June 11, 1918.

Application filed September 5, 1916. Serial No. 118,402.

*To all whom it may concern:*

Be it known that I, DAVID AHLDIN, a subject of the King of Sweden, residing in New York, county of New York, State of New York, have invented certain new and useful Improvements in Automatic-Locking Coupling Connections, of which the following is a specification.

My invention has for one of its objects to provide an improved construction of coupling means in which the act of tightening the same causes an automatic locking of the tightening member.

A further object is to provide a self-contained automatically locking coupling connection; that is, a connection in which the locking means is inherent in the construction in consequence of which a separate locking element or means is not required.

Other objects and advantages of my invention will be particularly pointed out in the detailed description thereof which follows or will be apparent from such description.

In order that my invention may be more readily understood and its practical advantages more fully appreciated, reference should be had to the accompanying drawing in which I have illustrated certain forms of construction thereof and have also illustrated practical applications of it as it will be used.

In the drawing:

Figure 1 is a transverse sectional view through the overlapping ends of a hose and a pipe and also showing in longitudinal section a clamping band provided with locking means embodying my invention, the said band being shown in untightened condition;

Fig. 2 is a similar view with the connecting coupling and the band shown in tightened condition;

Fig. 3 is a sectional view taken on line 3—3 of Fig. 2;

Fig. 4 is a view partly in elevation and partly in longitudinal section, illustrating another application of my invention in practical use; and Fig. 5 is a view showing the connected parts in transverse section and showing a modified construction of device, partly in section and partly in edge elevation, embodying my invention.

In Figs. 1, 2, 3 and 5 of the drawing, I have shown my invention as it is employed for the connection of the adjacent ends of a band by means of which the overlapping or telescoping ends of a hose and a pipe or nipple are connected together.

In Fig. 4, I have shown the same as it is employed for the purpose of connecting the adjacent ends of rods in which use it is substituted for the ordinary turn-buckle.

Referring to Figs. 1, 2, 3 and 4 of the drawing, 1 designates the end portion of a metal pipe or nipple which projects into the end portion 2 of a rubber hose or similar pipe or tube.

Referring now to Figs. 1, 2 and 3, 3 designates a band extending around the overlapping or telescoping portions of these pipes. At one end the said band is provided with a projecting portion 4 having an opening 5 extending therethrough. At its opposite end the said band is provided with a curved bent portion 6. The said bent portion forms a seat or housing for a cylindrical nut 7 which is situated therein. The said curved bent portion 6 is provided with diametrically opposed holes or openings 8 and 9, through which the connecting and tightening screw-threaded bolt 10 extends. The nut 7 is provided with a screw-threaded opening 11 which opening is engaged by the screw threads upon the bolt 10.

In Fig. 4, I have shown my invention employed for the purpose of connecting the adjacent ends of rods (stay-rods) in which the connecting means performs the function of the ordinary turn-buckle. In the said figure, 12 designates one end of a rod which is screw-threaded as shown. The screw-threaded portion engages the internally screw-threaded portion 13 of the connecting device 14, said connecting device being provided with an opening 15 into which the end portion 12 of the said rod projects. 16 designates a rod terminating in a flattened portion 17, the end of which is curved and bent as shown at 6' to form a seat for the cylindrical nut 7'. The bent curved portion 6' is provided with diametrically opposed openings 8' and 9', through which passes the screw-threaded rod-like portion 18 which projects or extends from the portion 14. The cylindrical nut 7' is provided with a screw-threaded opening 11' with which the screw-threaded portion of the rod-like part 18 is engaged.

In Fig. 5 of the drawing, the ends of the band 3 overlap and one end is provided with a projection 4 having an opening as in the construction shown in Figs. 1 and 2. The opposite end of the band 3 preferably is tapered as shown at 20 and extends underneath the end having the projection 4 so that the portion of the tube 2 underneath the connecting bolt 10 is covered, protected and clamped by the said band. With the ends of the band overlapped as shown, the tube 2 is not likely to be pinched or puckered by the action of said band and therefore is not apt to be broken or ruptured.

The loop 6 for holding the cylindrical nut 7 for engaging the bolt 10 is formed in the outer free end of a separate strap or band 21 secured by rivets or otherwise at 22 to the band 3.

It will be understood also that the projection 4 or an equivalent connecting means may be formed upon a separate strap similar to the strap 21.

In the employment of my invention the connecting device as the bolt 10 in Figs. 1, 2, 3 and 5 or the projected rod-like portion 18 as in Fig. 4, is engaged with a cylindrical nut 7 or 7'. Until the same is tightened so as to exert considerable tension upon the bent curved portion 6 or 6' the said connecting device is out of contact with the edges of the openings 8 and 9 or 8' and 9' as is clear from Fig. 1 of the drawing. When the connecting and tightening device is tightened, however, so as to exert tension upon the curved end portion 6 or 6' the latter tends to straighten out or unbend with the result that the lower edge of the opening 9 or 9' contacts with a portion upon the lower side of the connecting device, while the upper edge of the opening 8 or 8' upon the opposite side of the cylindrical nut 7 or 7' contacts with a portion of the upper side of the said connecting device. This last described relationship is clearly shown in Figs. 2 and 4 of the drawing.

It is apparent that upon the turning of the connecting and tightening device employed to connect the adjacent ends of the parts connected in a direction to tighten the same, the said ends tend to approach each other and simultaneously there is a slight straightening out of the curved portion 6 or 6' so that there is a slight change in the relationship between the cylindrical nut 7 or 7' and the surrounding portion 6 or 6'. This change of relationship will be obvious upon a comparison of Fig. 1 with Figs. 2 and 4 of the drawing.

The contact of upper and lower portions of the openings 8 and 9 or 8' and 9' with corresponding parts of the connecting bolt or rod, binds the latter so that it cannot accidentally turn so as to loosen the connections between the adjacent ends of the member or members and so that the tension of the said connection will not be accidentally altered.

It will be understood that my invention is susceptible of embodiment in other forms of construction and that changes in the details of construction may be made without departing therefrom, as for instance, both of the adjacent end portions to be connected may be provided with curved portions and with a cylindrical nut in either one or both of said curved portions.

I claim:—

1. In a coupling connection, the combination of portions to be connected together, one of the said portions having a curved end portion the opposite sides of which are provided with openings extending therethrough, a nut within the said curved end portion said nut having an opening in alinement with the openings in said curved portion and a connecting member for connecting the said portions, one end portion of the said connecting member being in engagement with the opening in said nut and with said curved portion whereby said curved portion acts automatically to lock the said connecting member against accidental rotation after it has been tightened, substantially as described.

2. In a coupling connection, the combination of adjacent end portions to be connected together, one of the said end portions comprising a cylindrically curved part having diametrically disposed openings therein, a cylindrical nut situated within the said curved portion said nut having a screw-threaded opening in alinement with the openings in the said curved part and a device for connecting the said end portions, said device being in engagement with the screw-threaded opening in the said nut and projecting through the opening in the said cylindrically curved part, portions of the edges of said openings contacting with and pressing against portions of the said connecting device when the latter is tightened.

3. In a coupling connection, the combination of adjacent end portions, a connecting device having connection with and extending between said end portions, one of the said end portions comprising a cylindrically curved part, said part having diametrically disposed openings therein and a cylindrical nut situated within the said cylindrically curved part and having a screw-threaded opening extending therethrough in alinement with the oppositely disposed openings in the said cylindrically curved part, said screw-threaded opening being adapted to be engaged by the said connecting device, and portions of the said curved part acting automatically upon said device upon the tightening of the same to prevent its accidental disengagement from said nut, substantially as described.

4. In an automatic locking coupling connection, the combination of the adjacent end portions of a band, a connecting bolt having connection with and extending between said end portions, one of the said end portions comprising a cylindrically curved yielding part, said curved yielding part being provided with diametrically disposed openings therethrough and a cylindrical nut situated within the said cylindrically curved part and having a screw-threaded opening extending therethrough in alinement with the said diametrically disposed openings, the said connecting bolt extending through the said diametrically disposed openings and being in engagement with the screw-threaded opening through said nut, oppositely related portions of the edges of said openings at opposite sides of the said nut being adapted to engage oppositely related parts of the said bolt when the latter is tightened to prevent accidental turning movement of the same.

5. A coupling connection for securing together the telescoping ends of tubes, said connection comprising a band having overlapping ends, said band extending around the telescoping portions of said tubes, a strap connected with said band and provided with a curved part at its outer free end, a correspondingly curved nut situated in said curved part, and a connecting means in engagement with said nut and having connection with the opposing end of said band, the said curved part being provided with means which acts automatically upon the tightening of said connecting means to engage the latter to lock it against accidental disengagement from said nut.

In testimony that I claim the foregoing as my invention, I have hereunto signed my name this 31st day of August, A. D. 1916.

DAVID AHLDIN.

Copies of this patent may be obtained for five cents each, by addressing the "Commissioner of Patents, Washington, D. C."